(12) United States Patent
Bateman

(10) Patent No.: US 8,600,113 B2
(45) Date of Patent: Dec. 3, 2013

(54) SYSTEM, METHOD AND COMPUTER PROGRAM PRODUCT FOR VIDEO FINGERPRINTING

(75) Inventor: Martin Bateman, Fife (GB)

(73) Assignee: The University Court of the University of St. Andrews, Fife (GB)

( * ) Notice: Subject to any disclaimer, the term of this patent is extended or adjusted under 35 U.S.C. 154(b) by 1679 days.

(21) Appl. No.: 10/986,064

(22) Filed: Nov. 12, 2004

(65) Prior Publication Data

US 2006/0103732 A1 May 18, 2006

(51) Int. Cl.
*G06K 9/00* (2006.01)
(52) U.S. Cl.
USPC ...... 382/107; 382/100; 382/190; 707/E17.02; 707/E17.023; 713/176
(58) Field of Classification Search
USPC ......... 382/100, 107, 190, 191, 207, 217, 206; 713/176; 380/200–202; 707/E17.02, 707/E17.023, E17.028
See application file for complete search history.

(56) References Cited

U.S. PATENT DOCUMENTS

| | | | | |
|---|---|---|---|---|
| 6,462,773 | B1 * | 10/2002 | Koga | 348/143 |
| 6,816,617 | B2 * | 11/2004 | Yamori et al. | 382/236 |
| 6,892,193 | B2 * | 5/2005 | Bolle et al. | 706/20 |
| 8,433,108 | B2 * | 4/2013 | Bateman | 382/124 |
| 2001/0004739 | A1 * | 6/2001 | Sekiguchi et al. | 707/100 |
| 2003/0185417 | A1 | 10/2003 | Alattar et al. | |
| 2004/0163106 | A1 * | 8/2004 | Schrempp et al. | 725/31 |
| 2006/0001833 | A1 | 1/2006 | Kodama | |

FOREIGN PATENT DOCUMENTS

| | | |
|---|---|---|
| JP | 2003-216954 A | 7/2003 |
| JP | 2004288281 | 10/2004 |
| WO | WO 97/40454 | 10/1997 |
| WO | WO 0251063 | 6/2002 |

OTHER PUBLICATIONS

Mohan, R.; Video sequence matching. Acoustics, Speech and Signal Processing, 1998. Proceedings of the 1998 IEEE International Conference on May 12-15, 1998, vol. 6, pp. 3697-3700.*
Oostveen, J; et al. Feature Extraction and a Database Strategy for Video Fingerprinting. Proceedings of the 5th International Conference on Recent Advances in Visual Information Systems, Lecture Notes in Computer Science; vol. 2314. Pub Year 2002, pp. 117-128.*
B-T Truong, S. Venkatesh, and C. Dorai; Automatic Genre Identification for Content-Based Categorization. In Proc. Int. Conf. on Pattern Reconition Sep. 2000 .230-233.*
Hampapur et al., "Comparison of Sequence Matching Techniques for Video Copy Detection".

(Continued)

*Primary Examiner* — Matthew Bella
*Assistant Examiner* — Julian Brooks
(74) *Attorney, Agent, or Firm* — Venable LLP; Jeffri A. Kaminski

(57) ABSTRACT

A method for fingerprinting a video involving identifying motion within the video and using a measure of the identified motion as a fingerprint. Once videos are fingerprinted, these fingerprints can be used in a method for identifying video. This involves creating a motion fingerprint for unidentified videos; comparing the fingerprints of the known and unknown videos, and identifying whether the unknown video is a copy of the known video based on the step of comparing.

17 Claims, 7 Drawing Sheets

(56) References Cited

OTHER PUBLICATIONS

Fred Jordan et al., Proposal of a Watermarking Technique for Hiding/Retrieving Data in Compressed and Decompressed Video, International Organisation for Standardisation, Jul. 1997.

Martin Bateman, Video Motion As a Video Fingerprint, School of Computer Science, 2004 International Conference on Imaging Science, Systems, and Technology, Jun. 21-24, 2004.

Frank Hartung et al., Spread Spectrum Watermarking: Malicious Attacks and Counterattacks, Telecommunications Laboratory, University of Erlangen-Nuremberg, Jan. 1999.

Fabien A.P. Petitcolas et al., Attacks on Copyright Marking Systems, vol. 1525, Lecture Notes in Computer Science, Apr. 14-17, 1998, pp. 218-238.

Gerrit Langelaar, Real-time Labeling of MPEG-2 Compressed Video, Faculty of Information Technology Systems, Delft University of Technology, pp. 1-30.

Frank Hartung et al., Watermarking of Uncompressed and Compressed Video, Telecommunications Institute—University of Erlangen-Nuremberg, vol. 66, No. 3, May 1998, pp. 283-301 (pp. 1 and 2 only—complete copy to be submitted).

Takahashi et al., "An Analysis of Video Searching Methods for Temporal Characteristics", format of broadcast, Japan, Movie Information and Media Associates Inc., Dec. 15, 2000, vol. 24, No. 79, pp. 61-65.

Translation of the parts of Takahashi et al.

* cited by examiner

SYSTEM, METHOD AND COMPUTER PROGRAM PRODUCT FOR VIDEO FINGERPRINTING

BACKGROUND OF THE INVENTION

1. Field of the Invention

The present invention relates to a system and method for fingerprinting a video and subsequently using that fingerprint to identify copies of original video files.

2. Related Art

With the growth in both bandwidth and peer-to-peer applications, there has been an explosion in the number of movie files being copied across the Internet. Some sources claim that up to sixty percent of traffic is now made up of peer-to-peer traffic, and a significant amount of this is movie files, which have been illegally copied from authentic sources. As a result, copyright owners are losing a large amount of money through lost royalty payments. Legal action against the peer-to-peer network owners does little to discourage copyright infringement since if one network is closed down then another one appears.

Conventionally, there are four sources of illegal movie downloads available on peer-to-peer systems. A first example is derived from a hand-held video camera that is taken into a movie theatre and used to record the movie as it is being projected on to the screen. "Starwars Episode 1: The Phantom Menace" was copied in this manner and available on the internet within one week of the US box office release. These recordings typically have the lowest audio and visual quality. Alternatively, movies may be recorded from broadcast television. These typically already include visual watermarks in the form of television station logos. This type of video file can range in quality since it may have been recorded from a noisy analogue signal. However, increasingly it will be taken from a digital source such as a cable or satellite station broadcasting using MPEG-2. Another source of illegal movie files is referred to as a "screener". These are copies of previews of an unreleased movie that are issued to critics and censors, for example. Finally, an illegal copy of a film may be made from retail versions of digital versatile discs (DVDs), which have been sold to the public. These are typically the highest quality copies as a large amount of time can be taken to encode the media from a clean source.

To counteract the many and varied ways for copying and distributing movies illegally, various digital fingerprinting techniques have been developed. Digital fingerprinting is a form of digital watermarking, which typically involves embedding data within a document to uniquely identify the copyright holder. Known techniques for video watermarking have emerged from techniques developed for still images. One of these techniques treats the video as a series of still images and adapts existing watermarking schemes from still images to video. For example, the technique identified in "Real-time labelling of MPEG-2 compressed video" by Langelaar et al, *Journal of Visual Communication and Image Representation* 9, 4 (1998), pp 256-270, the contents of which are incorporated herein by reference in their entirety, describes a method that has been extended to video by watermarking the I-frames of an MPEG stream. While such watermarking techniques inherit all the experience from still image based techniques, they are processor intensive and so not ideal for dealing with large quantities of data.

As well as using still images, the temporal aspect of video has been exploited in various watermarking techniques. For example the article "Watermarking of uncompressed and compressed video" by Hartung et al, *Signal Processing* 66, 3 (1998), pp 283-216, the contents of which are incorporated herein by reference in their entirety, describes a method in which a watermark is spread over a number of frames. This method permits higher robustness, although it can be computationally expensive. Another known technique considers the video as a compressed data stream. A technique of this nature is described in the article "Proposal of a watermarking technique for hiding/retrieving data in compressed and decompressed video" by Jordan et al, *iso/iee July* 1997 the contents of which are incorporated herein by reference in their entirety. This proposal describes a method that embeds watermark information into motion vectors of the encoded video. In particular, motion vectors pointing to flat areas are modified in a pseudorandom way. Advantages of this method are that it does not introduce any visible artefacts and the embedded information can be retrieved directly from the motion vectors as long as the video is in its compressed form. After the video has been decompressed, the video must be recompressed for detection of the watermark. This works because during the recompression process the motion vectors are found with a high enough probability to statistically recover the watermark. This is a simple mechanism that makes real-time detection possible. However, a problem with this approach is that the watermark may be tied to a specific video CODEC and therefore may not survive transcoding.

Just as there are people wishing to identify the owners of media there are groups that wish to obscure the origins, typically by attacking the watermark. In the article "Spread Spectrum Watermarking: Malicious attacks and counter attacks" *SPIE Security and Watermarking of Multimedia Contents* 99 (San Jose, Calif. 1999), the contents of which are incorporated herein by reference in their entirety, Hartung et al present four different types of attack upon digital watermarks. The first of these are so called 'simple attacks'—sometimes also called 'waveform attacks' or 'noise attacks'. These attempt to impair the detection of the embedded watermark without identifying and isolating it. Examples include linear and general non-linear filtering, waveform-based compression (JPEG, MPEG), addition of noise, addition of offset, cropping, quantisation in the pixel domain, conversions to analogue, and gamma correction. Other attacks include 'detection-disabling attacks'—sometimes called 'synchronization attacks'. These attempt to break the correlation and to make recovery of the watermark difficult if not impossible. This type of attack is performed normally by geometric distortion, for example zooming, shift in spatial or temporal direction, rotation, shear, cropping, pixel permutation, subsampling, removal or insertion of pixels or pixel clusters. In contrast, 'ambiguity attacks'—sometimes called 'deadlock', 'inversion', 'fake watermark' or 'fake original' attacks—attempt to confuse the detection process by producing fake original data or fake watermarked data. An example is an attack that attempts to discredit the authority of the watermark by embedding one or more additional watermarks so that it is unclear which was first. The final category of attacks is 'removal attacks', which involve attempting to analyze and identify the watermark and then separate it from the host data. The watermark is then discarded. Examples of this form of attack are collusion attacks, denoising certain non-linear filter operations or compression attacks using synthetic modelling.

Benchmarking tools have been created to automate the process of evaluating watermarking techniques, see for example "Attacks on Copyright Marking Systems" by Petitcolas et al Information Hiding, Second International Workshop IH '98 (Portland Oreg., 1998) Auesmith D., (Ed), Springer-Verlag, pp 219-239, the contents of which are incorporated herein by reference in their entirety. These are nonhostile processing mechanisms that can be applied to video. They are not designed to obfuscate or remove watermarks but may have that side effect. These are the processing mechanisms to which video being transported over peer-to-peer networks will have normally been exposed. Photometric attacks are those that modify the pixels of the video in some way. For example, when an analogue television signal is broadcast, the pixels may be changed because of noise. This may alter the colour of some portions of the image. Spatial de-synchronisation also changes the pixels. This is performed when the display format of a video is changed. The most common examples of this are changes in aspect ratio (4:3, 16:9, etc.) or changes in the spatial resolution (PAL, NTSC or SECAM). Temporal de-synchronisation is another technique that changes pixels. This is performed when a modification is made to the frame-rate of the movie. This may be done to reduce the file size, for example a 30 frames per second (fps) movie being reduced to 24 fps or lower. Another example is video editing. This encompasses all operations that may be made by a video editor. A simple and common example is cut-insert-splice. This is when a cut is made in the video, a commercial is inserted and the remaining video is spliced together. Other possibilities are the addition of logos or subtitles, or the cutting of certain scenes from a film perhaps to enable broadcast before a watershed.

A problem with traditional methods for automatically identifying video is that they either rely on the video bitstream remaining the same throughout its lifetime or require additional information to be stored within the video. Video streams are quite often re-encoded when either new or improved video CODECs are released, as in the case of DivX and XviD, or in order to reduce file size for easier transport across the network or to fit on certain media. This can completely defeat the identification process or increase the difficulty of identification as in the case of watermarking. In addition, since there are many video files infringing copyright that have not been encoded and released on to the Internet, it is too late to embed additional information into the video for identification purposes. Hence conventional techniques cannot be applied.

SUMMARY OF THE INVENTION

According to one aspect of the present invention, there is provided a method for fingerprinting video comprising identifying motion within the video and using a measure of the identified motion as a motion fingerprint.

By motion fingerprint it is meant a record or file that is representative of movement as a function of time within all or part of a video. By using motion within a video as a means for providing a fingerprint, there is provided a secure and effective mechanism for identifying video that does not require the addition of data to the video and that can be applied even when the video format is changed or in the presence of noise.

Identifying motion within the video may involve comparing a measure of luminance pixels of a first frame of the video with a corresponding measure of luminance of pixels of a second frame of the video; identifying differences between the luminance of the two frames and using the differences in luminance to determine a measure of motion. Identifying motion within the video may be done for the whole or part of the video.

According to another aspect of the invention, there is provided a system for fingerprinting a video, the system being operable to identify motion within the video and create a fingerprint using a measure of the identified motion.

Identifying motion within the video may be done by comparing a measure of luminance of pixels of a first frame of the video with a corresponding measure of luminance of pixels of a subsequent frame of the video; identifying differences between the luminance of the two frames and using the differences in luminance to determine a measure of motion.

According to yet another aspect of the invention, there is provided a computer program, preferably on a data carrier or a computer readable medium, the computer program having code or instructions for fingerprinting a video by identifying motion within the video and creating a fingerprint using a measure of the identified motion. The code or instructions for identifying motion within the video may be configured to compare a measure of luminance of pixels of a one frame of the video with a corresponding measure of luminance of pixels of another frame of the video; identify differences between the luminance of the two frames and use the differences in luminance to determine a measure of motion.

According to still another aspect of the invention there is provided a method for identifying video involving determining a motion fingerprint of an original video; determining a motion fingerprint for an unidentified video; comparing the known and the unknown motion fingerprints to identify any differences; and identifying whether the unknown video is a copy of the known video based on the step of comparing.

By fingerprinting motion and using this to detect copies of an original video, there is provided a detection process that can be automatically implemented and is effective even if the video data is decompressed or filtered.

The fingerprint may provide motion position information and comparing the fingerprints may involve comparing the position of motion in both fingerprints as a function of time.

The fingerprint may provide motion magnitude information and comparing the fingerprints may involve comparing the magnitude of motion as a function of time. For example, an average value of motion magnitude may be determined and comparing the fingerprints may involve comparing only points with an above average motion magnitude.

The fingerprints may provide motion position information and motion magnitude information. In this case, comparing the fingerprints may involve comparing the position of motion in both fingerprints as a function of time to provide a position similarity measure and comparing the motion magnitude as a function of time to provide a magnitude similarity measure, and using both the position and magnitude measures to provide an overall similarity measure. An average value of motion magnitude may be determined and comparing the fingerprints may involve comparing only points with an above average motion magnitude. Additionally or alternatively, comparing the fingerprints may involve determining a difference in length of the fingerprints, and scaling that difference depending on its value, wherein the scaled value is used together with the position and magnitude measures to provide a similarity measure.

According to yet still another aspect of the invention, there is provided a system for identifying video by creating a motion fingerprint of an original video; storing the motion fingerprint of the original video; creating a motion fingerprint for an unknown video; comparing the fingerprints of the known and unknown videos, and identifying whether the unknown video is a copy of the known video based on the step of comparing.

The fingerprint may provide motion position information and the system may be operable to compare the fingerprints by comparing the position of motion in the known and unknown fingerprints as a function of time. Additionally or alternatively, the fingerprint may provide motion magnitude information and the system may be operable to compare the fingerprints by comparing the magnitude of motion as a function of time. An average value of motion magnitude may be determined for each fingerprint and comparing the fingerprints may involve comparing only points with an above average motion magnitude. Additionally or alternatively comparing the fingerprints may involve determining a difference in length of the fingerprints, and scaling that difference depending on its value, wherein the scaled value may be together with the position and magnitude measures to provide a similarity measure.

The fingerprint may provide motion position information and motion magnitude information and the system may be operable to compare the fingerprints by comparing the position of motion in both fingerprints as a function of time to provide a position similarity measure; comparing the motion magnitude as a function of time to provide a magnitude similarity measure, and using both the position and magnitude measures to provide an overall similarity measure.

BRIEF DESCRIPTION OF THE DRAWINGS

Various aspects of the invention will now be described by way of example only and with reference to the accompanying drawings, of which.

DETAILED DESCRIPTION OF EXEMPLARY EMBODIMENTS OF THE PRESENT INVENTION

The video identification technique proposed herein uses the human perception system as a guide of how to recognize movie files. In particular, motion within a movie is used as the basis for a digital fingerprint. Often people are willing to reduce spatial and visual quality in order to maintain a temporal resolution above the level of persistence of motion so that the video motion does not appear jerky. The invention uses this to its advantage when identifying videos.

Video Motion Fingerprinting

Figure 1:
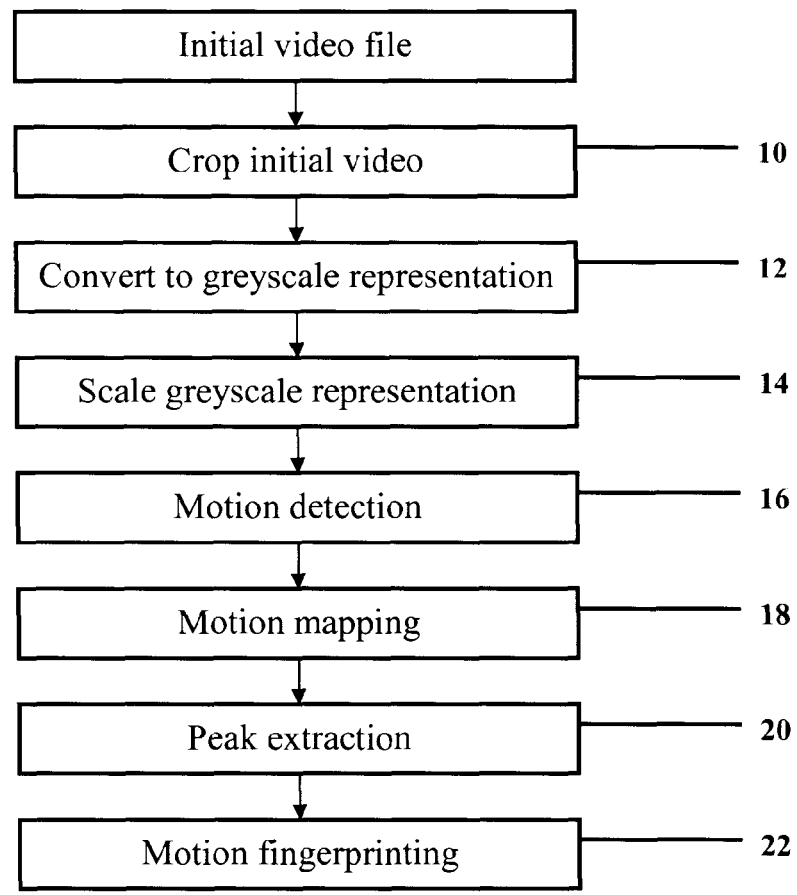
FIG. 1 is flow diagram of the steps for creating a motion fingerprint.

FIG. 1 shows various steps for fingerprinting a video by identifying motion within it. Typically these would be implemented using computer software, although of course hardware implementations would be possible. Firstly, the video is cropped to a standard aspect ratio 10. A good choice of aspect ratio would be 4:3, because all videos can be cropped to fit into this ratio while having most of the video visible. Next the video is converted to a greyscale representation 12. In the case of RGB, the luminance value of each pixel is calculated in order to get the greyscale value for the entire frame. This can be determined using the following equation:

luminance=(0.299×red)+(0.587×green)+(0.224×blue)

For YUV only the luminance (Y channel) would be used. The use of greyscale reduces the amount of data to be processed and therefore speeds up the scaling and motion detection processes. Greyscale also removes subtle differences in colour that may be present due to capturing or encoding.

Once the video is processed and represented by a greyscale equivalent, its spatial resolution is then scaled to a standard size 14. VideoCD (VCD) resolution (352×240) was chosen as the standard size for experimentation since it gives a reasonable resolution of image on which the motion detection can take place whilst having a sufficiently small amount of data to prevent the motion detection process from being processor intensive. It should be noted that although FIG. 1 shows these steps in a specific order, changing this would not fundamentally alter the fingerprinting process.

After scaling, the motion detection test is applied 16. This involves comparing each frame against the previous frame. Differences between the two are flagged as motion. This could be done by comparing every pixel of one frame with every pixel of the next frame. However this is relatively processor intensive and so instead in a preferred method, pixels are grouped together into macro-blocks of a pre-determined size, for example 5×5 pixels, and the average colour/luminance of these areas is calculated. Motion is detected as a change in the colour between frames within a macro-block, while the magnitude of the motion is deduced from the difference in colour. This reduces the possibility of wrongful detection of motion due to encoding artefacts or a noisy data source.

Figure 2:
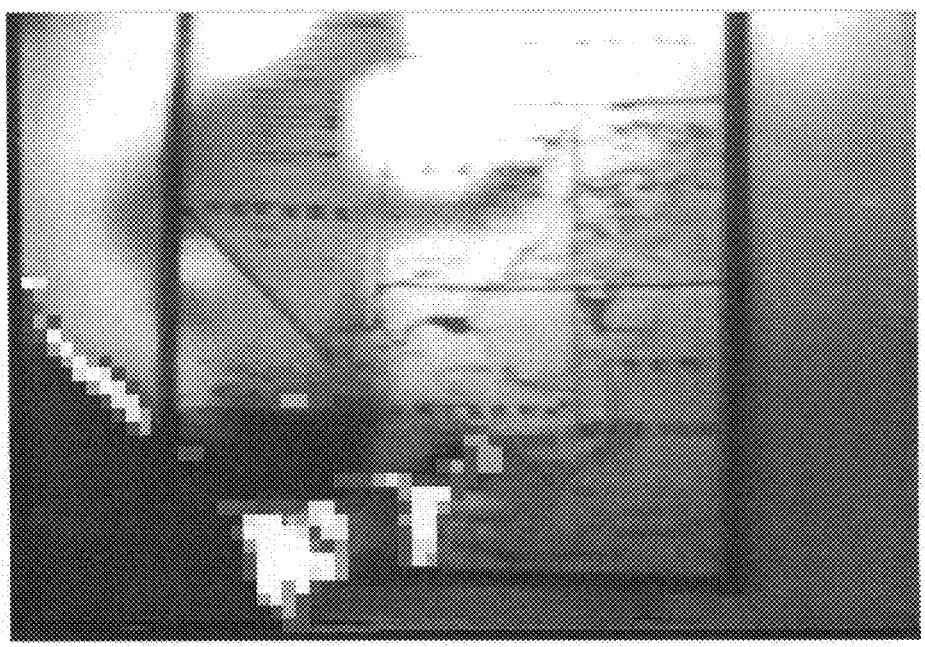
FIG. 2 is view of a single frame of a video.
Figure 3:
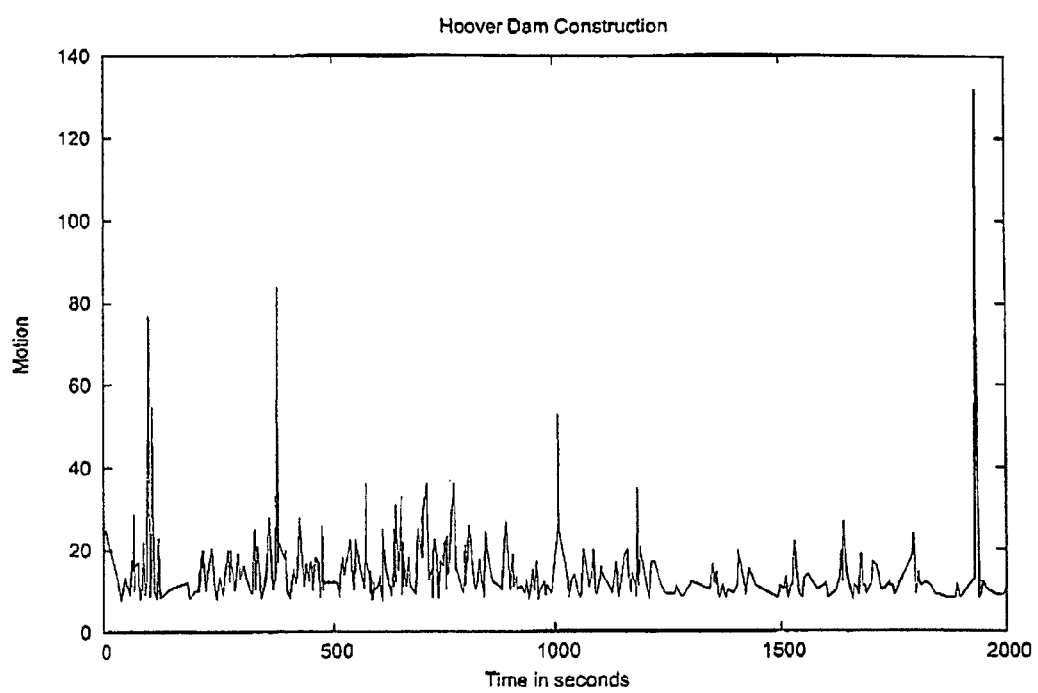
FIG. 3 is fingerprint of the video of FIG. 2.

A measure of the amount of motion of each frame relative to the preceding frame is calculated by summing the differences in colour between these frames for all macro-blocks to give a single motion figure that is indicative of the relative motion between the two adjacent frames. This results in a series of numbers, each indicative of a measure of motion between two adjacent frames for a given time. These results are then scaled by mapping 18 the measurements to a 44 point scale, 0 being the lowest and 44 being the highest. After the entire video has been processed the mean motion value is calculated. This is done by summing all of the motion figures for all frames of the file and determining the average value. Motion measurements below the mean are removed, so that only peaks above the mean level are extracted 20. This is done to save space and speed up matching. Then, the remaining information is used as the video motion fingerprint 22. An example of a fingerprint for the video of FIG. 2 is shown in FIG. 3. The peaks in this graph are portions of the video that have high levels of motion due for example to scene changes, camera panning, or close-ups of people.

Once the video motion fingerprint is created, it is stored in a database of motion fingerprints. The size of the motion fingerprints is dependent on the amount of motion that has been detected. Within experiments conducted to date, the fingerprints ranged from 1 kilobyte per minute up to 10 kilobytes per minute of video depending on the amount of motion within the video. Of course, this will vary depending on the video that is being fingerprinted.

Detection Process

Figure 4:
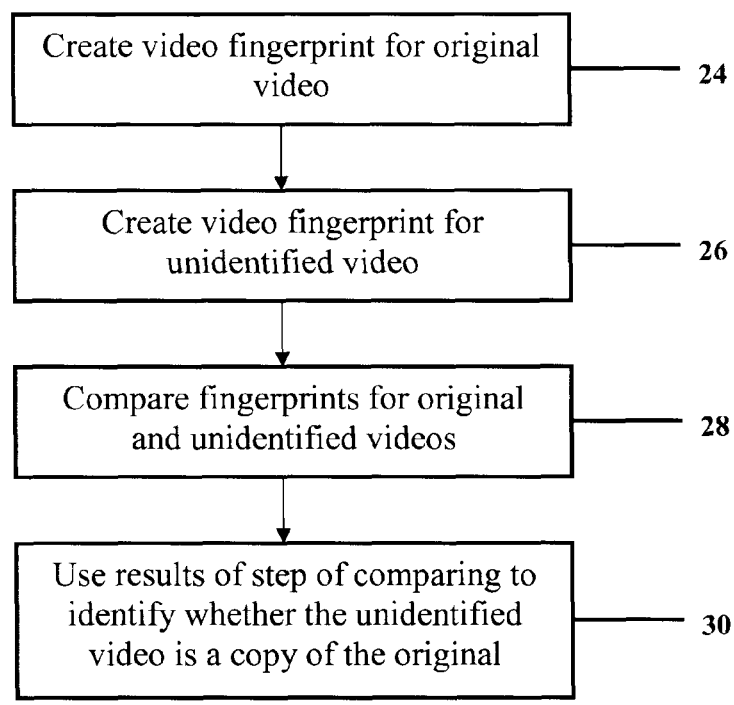
FIG. 4 is a flow diagram of a detection process for detecting whether two videos are the same.

The video motion fingerprint of the present invention can be used in a detection process to identify copies of original videos. FIG. 4 shows the basic steps that have to be taken. Again, these may be implemented in software or hardware.

The detection process starts by creating a motion fingerprint from the original video to be identified as described above 24. This fingerprint is stored in, for example, a database. Typically the database would include a number of fingerprints for a range of different known videos. In the event that an unknown video is captured, a fingerprint is created for it 26 and compared to the stored fingerprints for the known videos 28. Based on the comparison of the unknown and stored fingerprints, an assessment can be made as to whether the unknown video is a copy of one of the known videos 30.

The step of comparing 28 can be done using any suitable technique. In a preferred example, however, the comparison process works on three separate measurements of the video, these being the difference in length, the position of motion within the video and the difference in the magnitude of motion across the temporal plane.

The difference in length of the two videos being compared is scaled, as follows, so that small differences in movie length are unimportant:

$$length = scale(abs(fp1[fp1length] - fp2[fp2length]))$$

where $(abs(fp1[fp1length]-fp2[fp2length]))$ represents the difference in length of the fingerprints of the known and unknown videos, and the scale function reduces differences of less than a minute while increasing differences for a length over a minute. Various scaling functions could be used. However in a current embodiment, the length of the videos is scaled in the following way. If the difference in length is less than 15 seconds then the difference is halved. If the difference is less than 300 seconds then it is scaled by 0.75. For less than 600 seconds the difference is taken as is, for over 1200 seconds the difference is increased by 25% and for over 1200 seconds the difference is increased by 50%.

The position of motion within the video is taken into account by considering how well the occurrences of motion within the fingerprints match in the temporal plane. This can be expressed as:

$$position = \frac{missedpoints}{checkedpoints} \times 100$$

where checkedpoints is the number of points within fingerprint 1 that are above the mean, and missedpoints is the number of measurements in fingerprint 2 that are less than the mean plus the number of points which are above the mean in fingerprint 1 but below the mean in fingerprint 2.

The difference in magnitude of the motion across the temporal plane is also taken into account. This can be expressed as:

$$temporal = \frac{\sum_{i=0}^{fp\text{\textbackslash}length} abs(fp1[i] - fp2[i])}{checked\ points}$$

At each point along the fingerprint the absolute difference between the magnitude of fingerprint 1 and fingerprint 2, i.e. $abs(fp1[i]-fp2[i])$ is calculated. These are summed and the mean is calculated.

These three aspects of the video are summed to provide a simple similarity measurement:

$$similarity = length + position + temporal$$

The lower the similarity measurement the more closely the video files match. After experimenting it was determined that the cut off point for two fingerprints matching is 100, although of course it will be appreciated that other cut-off points may be used.

Tests

To test the robustness of the detection process, motion fingerprints were created for 50 high quality videos that had a range of levels of motion, and lengths from around 20 to 40 minutes. Video files of cartoons and lectures, as well as more traditional sources such as television programmes and films were included in the database. This served as the test sample. Tests were performed on a variety of transformations. For example, the video was transcoded in the following ways: change of CODEC; reduction in bit-rate; reduction in framerate; reduction in spatial resolution and addition of noise. The first four of these transformations are often seen when video is re-encoded for storage, such as on CDROM or for transmission over the Internet. The final transformation, addition of noise, was included since not all recordings of movies are made from 'clean' sources.

Figure 5:
FIG. 5 shows various images of degraded video frames.

As part of the evaluation of this fingerprint technique, the video files were re-encoded to introduce conditions likely to occur in practice, such as variation in bitrate or spatial or temporal resolution. VirtualDub v1.5.1 with the Microsoft MPEG4 3688 v3 CODEC was used to perform the re-encoding. Of course any other suitable CODEC could have been used. The video was re-encoded using only single pass methods. This is because 2- and 3-pass techniques provide higher quality movie files but for most of the tests degraded video was required so spending the extra time to provide high quality degraded video did not make sense. Several examples of the types of video degradation tested against are shown in FIG. 5.

Firstly it was decided to test how the method performed when identifying the original movie files. A set of fingerprints from a set of original video files (f1) was created and stored in a fingerprint database. The same video files were then taken and a new set of video fingerprints (f2) was created. It was found that each video file was correctly matched with the appropriate fingerprint in the database, typically with a difference between the fingerprints (in f1 and f2) of less than 1, whereas differences in fingerprints from different movie files were normally over 1000 with very similar files being between 100 and 1000.

Change of CODEC

The original video files were encoded using a small number of the most commonly used CODECs. The CODECs chosen were MPEG-1 and MPEG-2; MPEG-4 DivX, Xvid and MSMPEG-4, and Quicktime Sorensen. Each of these three CODEC families is typically wrapped in a different file format, .mpg, .avi and .mov respectively. The video was encoded so that the visual and temporal quality was similar to the original movie.

Using the motion finger printing method in which the invention is embodied, each of the encoded videos was correctly identified regardless of the CODEC used. This is because it is the visual quality and the ability of the motion detection algorithm to detect motion within the movie file that is central to the movie identification process.

Change of Bit-Rate

A selection of videos was taken and the image quality was degraded by re-encoding to a lower bit-rate, whilst keeping constant the frame rate and spatial resolution. In particular, the bit-rate was reduced from 500 kbps down to 25 kbps.

Figure 6:
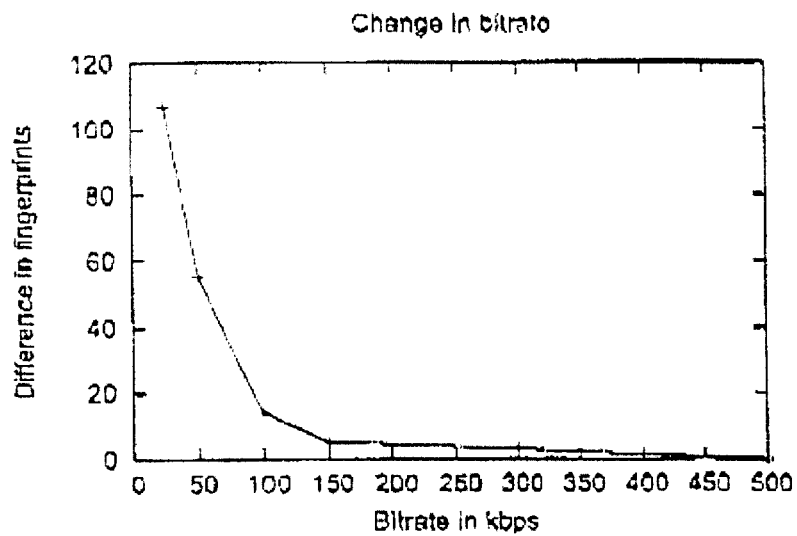
FIG. 6 is a plot of a measure of a difference between two video motion fingerprints as a function of bit-rate.

FIG. 6 shows the results of the detection process as a function of frame rate. From this is can be seen that as the bit-rate reduces the ability to recognise the motion fingerprint quickly tails off after 150 kbps. When the bit-rate is below 30 kbps the ability to match the motion fingerprint is lost. However, at and below 100 kbps the recordings suffer from blockiness and encoding artefacts that make the movie file very poor quality and unlikely to be watched. Hence, for practical purposes, variations in the bit-rate will not significantly impact on the detection process.

Change of Frame Rate

In this case, the image quality for a selection of the videos was degraded by re-encoding to a lower frame-rate, whilst keeping constant the bit-rate and spatial resolution. In particular, the frame rate was taken from the original frame rate of 23 down to 4 frames per second. This limit was selected, because it is well below the point of persistence of vision, which is generally thought to be around 12 to 15 frames per second. Frame rates between 24 and 5 frames per second were used with the bit-rate and spatial resolution kept at 500 kbps and 352×240 respectively.

Figure 7:
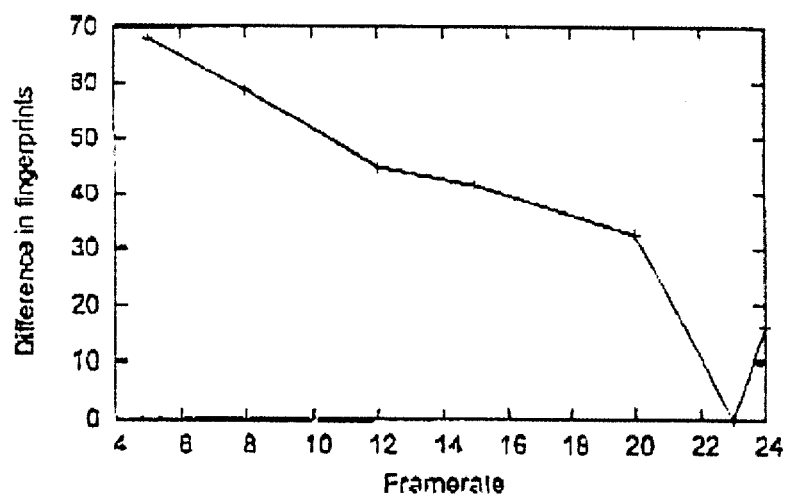
FIG. 7 is a plot of a measure of a difference between two video motion fingerprints as a function of frame-rate.

FIG. 7 shows the results of the detection process as a function of frame-rate. As would be expected reducing the frame-rate leads to increasing differences in the motion fingerprints. Increasing the frame-rate from the original also has a slight detrimental effect on the ability to recognise the video sequence. This accounts for the increase in the difference in the fingerprints when the frame-rate is increased. Nevertheless, the results indicate that whilst varying the frame rate does have an impact it is not significant enough to mean that the video would be unrecognisable.

Spatial Resolution

The spatial resolution was reduced to 176×144 keeping the frame-rate at 23 with the bit-rate remaining at 500 kbps. Despite this, the difference in the fingerprints for the modified and original videos was only 5.1. Hence, the movie file was still recognisable, even though the spatial resolution was reduced by half.

Luminance

Figure 8:
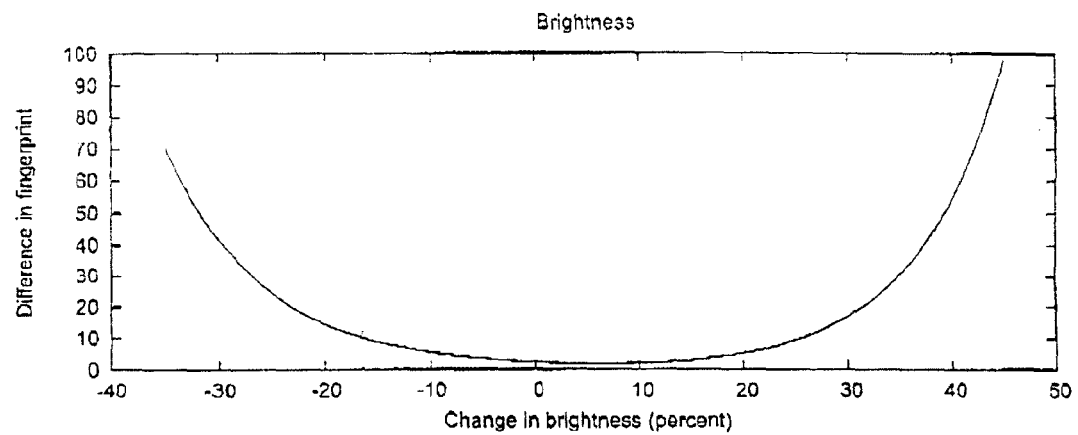
FIG. 8 is a plot of a measure of a difference between two video motion fingerprints as a function of a change in brightness.

FIG. 8 shows the results of the detection process as a function of brightness. From this is can be seen that reducing the brightness has more of a detrimental effect on the detection than increasing the brightness. This is because as the frame gets darker features of the video are hard to distinguish.

Addition of Noise

Noise was added to samples of the original videos using for example a NoiseGenerator, such that provided by MSU Graphics & Media. This was done to simulate the effect of noise that would be captured when recording from 'lossy' sources, such as broadcast television.

In a first test, white noise was added to the movie files and the detection process repeated. In practice, it was found that adding white noise made little difference to the ability to identify the movie file. This was unexpected. It is believed that this can be ascribed to the fact that the white noise added is not in motion and is therefore ignored by the fingerprinting technique.

As a further noise test, video stream banners were added to the video. This is the sort of thing that is normally added by television stations in order to identify themselves. There are two commonly used locations for banners or logos to be positioned, these being the top of the frame or the bottom of the frame. Black lines that stretch the width of the frame were added to the video. Motion fingerprints were generated for the new videos, which contained the banners. Then these were checked against the database of motion fingerprints to see if they could be identified. The border started at 10 pixels and went up to a 140 pixel border in 10 pixel increments.

Figure 9:
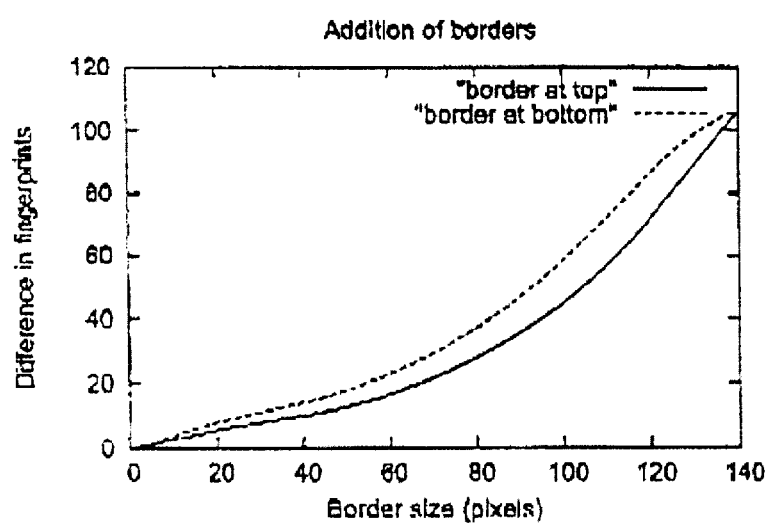
FIG. 9 is a plot of a measure of a difference between two video motion fingerprints as a function of border size.

Two separate experiments were performed, one with the border placed at the bottom of the frame and one with the border at the top. FIG. 9 shows the results of the detection process for both cases as a function of border size. From this it can be seen that detection failed at around 130 pixels. However, this is a border that covers over half of the original image (the frame was 240 pixels high), which is a situation that is unlikely to be seen in normal broadcast of television programmes or films. Hence, for practical purposes, variations in the border size do not significantly impact on the detection process.

Picture Manipulation

An example of picture manipulation is colour manipulation were the colour of the video is inverted. This was performed on the example video more out of interest rather than as a condition that would normally be experienced due to re-encoding, but it does demonstrate the robustness of the technique. It was found that the inverted video is identified just as well as the non-inverted video at the same encoding parameters. Another example of picture manipulation is horizontal or vertical inversion were the movie is flipped horizontally or vertically. The test video was exposed to these conditions and this had no impact on the ability of the film to be recognised since it is the motion over the entire frame that is important.

Summary

Motion detection has been demonstrated as a basis for the generation of a video fingerprint. The technique has been shown to perform well when movies have been re-encoded from their original source and in the process degraded by loss of spatial resolution, temporal resolution or reduction in bit-rate. Although this technique cannot prevent copyright infringement within peer-to-peer networks, it may aid in its detection operating as either a peer within the network or passively at link between a private network (such as a university) and the internet using traffic monitoring techniques to acquire the data.

In practice, a plurality of video fingerprints would be stored in a suitable database for use if and when video content is detected. In the event that such content is detected, it would be captured and a motion fingerprint automatically created. This would then be compared with the fingerprints in the database to identify whether there is a match between the fingerprint of the captured video and any of the stored fingerprints. In the event that there is a match, this is indicative that the intercepted video is a copy of the original and may be a copyright infringement. If this is the case, remedial action can be taken against both the source and the intended recipient of the infringing copy.

A skilled person will appreciate that variations of the disclosed arrangements are possible without departing from the invention. For example, although a specific technique for detecting motion is described, it will be appreciated that any other video motion detection process could be used. Likewise, any suitable method for identifying differences and/or similarities between two fingerprints could be used. In addition, to reduce the amount of time that it takes to identify a video, for example a movie, one option would be to perform fingerprinting and subsequent identification on small 'blocks' of the movie, rather than on the entire content. These blocks would take the form of 'scenes' where scenes are defined as a section of video between two portions of video that do not have motion. This would allow identification of video from smaller portions of the movie. As yet a further variation, while the fingerprints described above are created by identifying the temporal position of motion peaks within a video, another option would be to use the relative magnitudes of the motion peaks as the fingerprint. Accordingly the above description of the specific embodiment is made by way of example only and not for the purposes of limitation. It will be clear to the skilled person that minor modifications may be made without significant changes to the operation described.

What is claimed is:

1. A method for identifying video comprising:
creating, by at least one processor, a motion fingerprint for an unknown video, wherein said creating comprises:
comparing a measure of luminance of pixels or blocks of pixels of a first frame of the video with a corresponding measure of luminance of pixels or blocks of pixels of a second frame of the video;
identifying differences between the luminance of like pixels or blocks of pixels of the two frames;
summing the identified differences to determine a measure of motion magnitude between the two frames for a given time to thereby determine an interframe motion magnitude measure;
repeating said comparing, said identifying, and said summing, for a plurality of frame pairs; and
using only the interframe motion magnitude measures to form the motion fingerprint, wherein the motion fingerprint comprises a plurality of the interframe motion magnitude measures as a function of time;
comparing, by the at least one processor, the motion fingerprint of the unknown video with at least one motion fingerprint for at least one known video; and
identifying, by the at least one processor, whether the unknown video is the same as the known video based on the step of comparing the motion fingerprint.

2. The method as claimed in claim 1 wherein each fingerprint provides motion position information and comparing the unknown and known fingerprints involves comparing the position of motion in both fingerprints as a function of time.

3. The method as claimed in claim 1 wherein each fingerprint provides motion magnitude information and comparing the fingerprints involves determining an average value of motion magnitude and comparing the fingerprints involves comparing only points with an above average motion magnitude.

4. The method as claimed in claim 1 wherein comparing the fingerprints involves determining a difference in length of the fingerprints, and scaling that difference depending on its value.

5. The method as claimed in claim 1 wherein the fingerprint provides motion position information and motion magnitude information and comparing the fingerprints involves comparing the position of motion in both fingerprints as a function of time to provide a position similarity measure and comparing the motion magnitude as a function of time to provide a magnitude similarity measure, and using both the position and magnitude measures to provide a similarity measure indicative of similarity between the fingerprints.

6. The method as claimed in claim 5 wherein an average value of motion magnitude is determined and comparing the fingerprints involves comparing only points with an above average motion magnitude.

7. The method as claimed in claim 5 wherein comparing the fingerprints involves determining a difference in length of the fingerprints, and scaling that difference depending on its value, and the scaled value is used together with the position and magnitude measures to provide a similarity measure.

8. A system for identifying video comprising:
means for creating a motion fingerprint for an unknown video, wherein said means for creating comprises:
means for comparing a measure of luminance of pixels or blocks of pixels of a first frame of the video with a corresponding measure of luminance of pixels or blocks of pixels of a second frame of the video;
means for identifying differences between the luminance of like pixels or blocks of pixels of the two frames;
means for summing the identified differences to determine a measure of motion magnitude between the two frames for a given time to thereby determine an interframe motion magnitude measure;
means for repeating said comparing, said identifying, and said summing, for a plurality of frame pairs; and
means for using only the interframe motion magnitude measures to form the motion fingerprint wherein the motion fingerprint comprises a plurality of the interframe motion magnitude measures as a function of time;
means for comparing the motion fingerprint of the known video with a motion fingerprint of at least one known video; and
means for identifying whether the unknown video is the same as the known video based on the step of comparing the motion fingerprint.

9. The system as claimed in claim 8 wherein the fingerprint provides motion position information and the system is operable to compare the fingerprints by comparing the position of motion in the known and unknown fingerprints as a function of time.

10. The system as claimed in claim 8 wherein the fingerprint provides motion position information and motion magnitude information and the system is operable to compare the fingerprints involves by comparing the position of motion in both fingerprints as a function of time to provide a position similarity measure; comparing the motion magnitude as a function of time to provide a magnitude similarity measure, and using both the position and magnitude measures to provide an overall similarity measure.

11. The system as claimed in claim 10 wherein an average value of motion magnitude is determined and comparing the fingerprints involves comparing only points with an above average motion magnitude.

12. The system as claimed in claim 10 wherein comparing the fingerprints involves determining a difference in length of the fingerprints, and scaling that difference depending on its value, wherein the scaled difference value is used together with the position and magnitude measures to provide a similarity measure.

13. A method for identifying video comprising:
creating, by at least one processor, a motion fingerprint for an unknown video, wherein said creating comprises:
comparing a measure of luminance of pixels or blocks of pixels of a first frame of the video with a corresponding measure of luminance of pixels or blocks of pixels of a second frame of the video;
identifying differences between the luminance of like pixels or blocks of pixels of the two frames;
using the identified differences to determine a measure of motion magnitude between the two frames, for a given time to thereby to determine an interframe motion magnitude measure;
repeating said comparing, said identifying, and said using, for a plurality of frame pairs; and
using only the interframe motion magnitude measures to form the motion fingerprint wherein the motion fingerprint comprises a plurality of the interframe motion magnitude measures as a function of time;
comparing, by the at least one processor, the motion fingerprint of the unknown video with at least one motion fingerprint for at least one known video; and identifying, by the at least one processor, whether the unknown video is the same as the known video based on the step of comparing the motion fingerprint.

14. A system for identifying video comprising:
means for creating a motion fingerprint for an unknown video, wherein said creating comprises:
   means for comparing a measure of luminance of pixels or blocks of pixels of a first frame of the video with a corresponding measure of luminance of pixels or blocks of pixels of a second frame of the video;
   means for identifying differences between the luminance of like pixels or blocks of pixels of the two frames;
   means for using the identified differences to determine a measure of motion magnitude between the two frames, thereby to determine an interframe motion magnitude measure;
   means for repeating said comparing, said identifying, and said using, for a plurality of frame pairs; and
   means for using only the interframe motion magnitude measures to form the motion fingerprint, wherein the motion fingerprint comprises a plurality of the interframe motion magnitude measures as a function of time;
means for comparing the motion fingerprint of the unknown video with at least one motion fingerprint for at least one known video; and
means for identifying whether the unknown video is the same as the known video based on the step of comparing the motion fingerprint.

15. A method for identifying video comprising:
creating, by at least one processor, a motion fingerprint for an unknown video, wherein said creating comprises:
   comparing a measure of luminance of pixels or blocks of pixels of a first frame of the video with a corresponding measure of luminance of pixels or blocks of pixels of a second frame of the video;
   identifying differences between the luminance of like pixels or blocks of pixels of the two frames;
   using the identified differences to determine a single figure representative of motion between the two frames for a given time to thereby determine an interframe motion magnitude measure;
   repeating said comparing, said identifying, and said using, for a plurality of frame pairs; and
   using said single figure representative of motion between the two frames to form the motion fingerprint, wherein the motion fingerprint comprises only a plurality of the interframe motion magnitude measures as a function of time;
comparing, by the at least one processor, the motion fingerprint of the unknown video with at least one motion fingerprint for at least one known video; and
identifying, by the at least one processor, whether the unknown video is the same as the known video based on the step of comparing the motion fingerprint.

16. The method as claimed in claim 15 wherein each fingerprint provides motion position information and comparing the unknown and known fingerprints involves comparing the position of motion in both fingerprints as a function of time.

17. A system for identifying video comprising:
means for creating a motion fingerprint for an unknown video, wherein said creating comprises:
   means for comparing a measure of luminance of pixels or blocks of pixels of a first frame of the video with a corresponding measure of luminance of pixels or blocks of pixels of a second frame of the video;
   means for identifying differences between the luminance of like pixels or blocks of pixels of the two frames;
   means for using the identified differences to determine a single figure representative of motion between the two frames for a given time to thereby determine an interframe motion magnitude measure;
   means for repeating said comparing, said identifying, and said using, for a plurality of frame pairs; and
   means for using said single figure representative of motion between the two frames to form the motion fingerprint, wherein the motion fingerprint comprises only a plurality of the interframe motion magnitude measures as a function of time;
means for comparing the motion fingerprint of the unknown video with at least one motion fingerprint for at least one known video; and
means for identifying whether the unknown video is the same as the known video based on the step of comparing the motion fingerprint.

* * * * *